Patented Dec. 12, 1922.

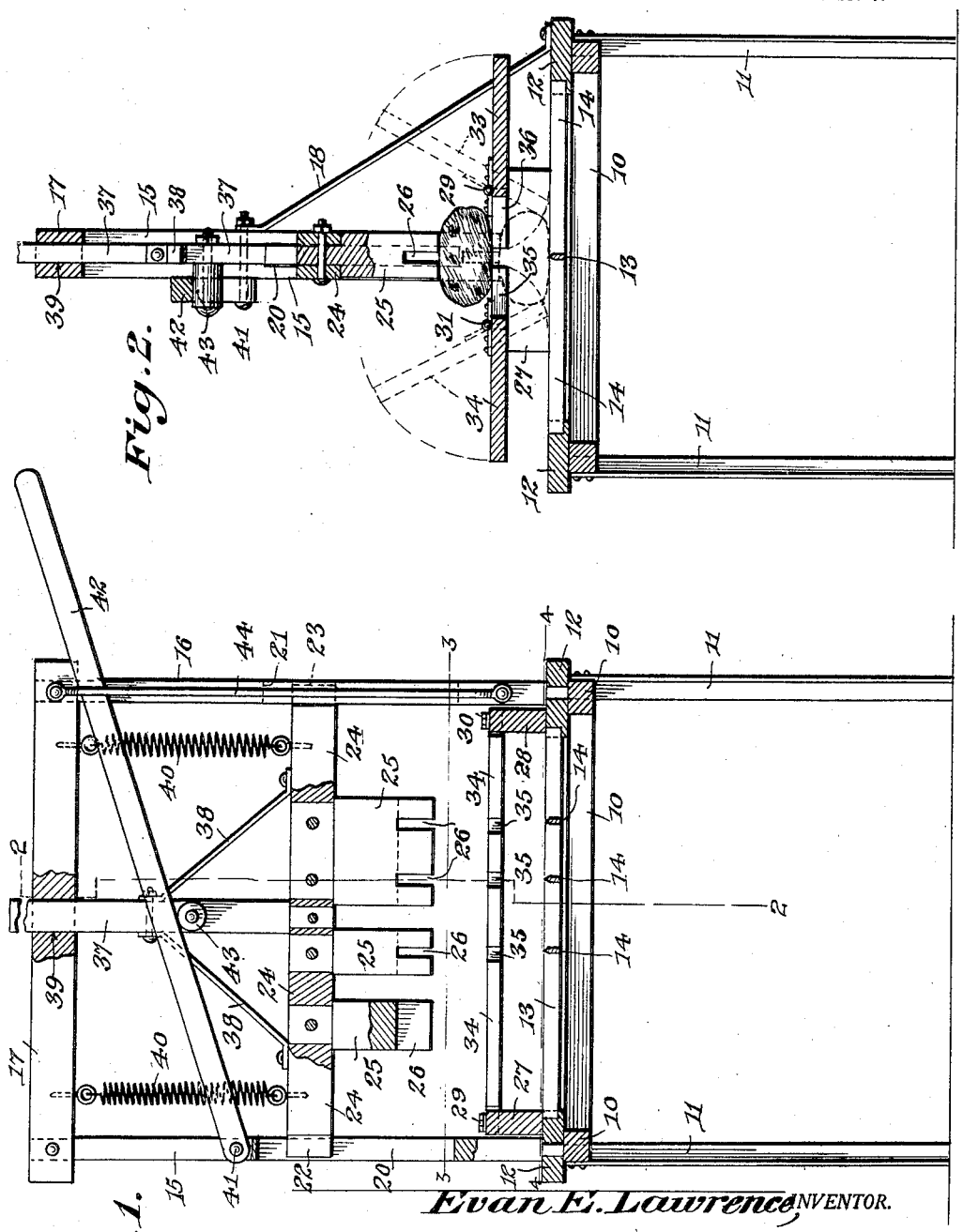

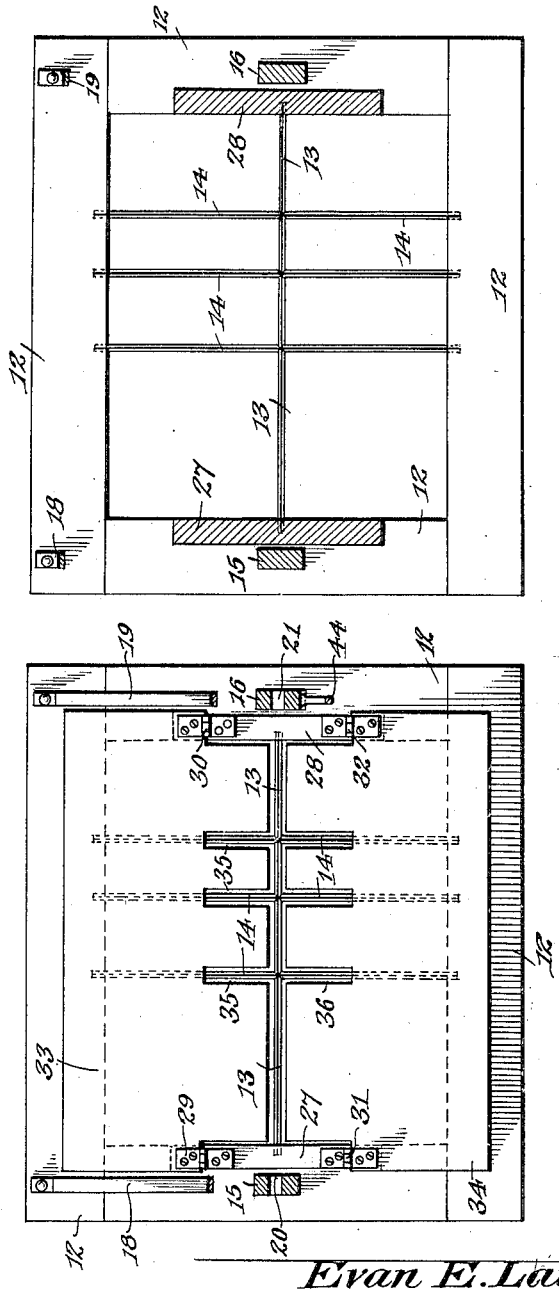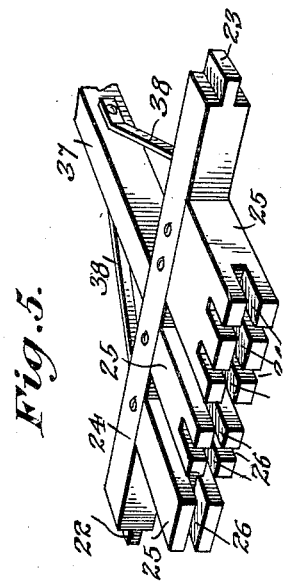

1,438,925

UNITED STATES PATENT OFFICE.

EVAN E. LAWRENCE, OF SOUTH BYRON, NEW YORK.

SEED-POTATO CUTTER.

Application filed July 13, 1922. Serial No. 574,775.

*To all whom it may concern:*

Be it known that I, EVAN E. LAWRENCE, a citizen of the United States, residing at South Byron, in the county of Genesee and State of New York, have invented certain new and useful Improvements in Seed-Potato Cutters, of which the following is a specification.

This invention relates to seed potato cutters, and has for one of its objects to simplify and improve the construction and increase the efficiency and utility of devices of this character.

Another object of the invention is to provide a device of this character capable of cutting potatoes into two, four, or six portions without structural change of any kind in the apparatus.

Another object of the invention is to provide a device of this character including a yieldable support for the potatoes prior to the severing action.

With these and other objects in view the invention consists in certain novel features of construction as hereinafter shown and described and then specifically pointed out in the claims and in the drawings illustrative of the preferred embodiment of the invention:—

Figure 1 is a side elevation, partly in section, of the improved apparatus.

Fig. 2 is an end elevation in vertical section on the line 2—2 of Fig. 1.

Fig. 3 is a transverse section on the line 3—3 of Fig. 1.

Fig. 4 is a transverse section on the line 4—4 of Fig. 1.

Fig. 5 is a detached perspective view of the movable beam and plunger devices.

Fig. 6 represents perspective details of portions of a pair of the severing blades.

The improved apparatus comprises a platform or base frame 10 supported on legs 11, the frame being preferably of wood and the legs of metal L-bars.

Supported upon the base frame 10 is an upper rectangular supporting frame 12 preferably overhanging the base frame 10, as shown in Figs. 1 and 2.

Supported in the frame 12 are a plurality of cutting blades, one blade 13 extending longitudinally of the frame 12 and centrally thereof, and a plurality of similar blades 14 extending transversely of the frame 12 and also transversely of the longitudinal blade 13, and in spaced relation, as shown in Fig. 3.

At their ends the blades 13 and 14 are seated in sockets in the frame 12, and "halved" where they cross each other as shown in Fig. 6.

Rising from the frame 12 are standards 15 and 16 and connected at their upper ends by a head member 17, the standards being supported from the frame 12 by angular braces 18 and 19. The standards 15 and 16 are formed respectively with longitudinally directed guideways 20 and 21 in which the reduced ends 22 and 23 of a beam member 24 operates.

Depending from the beam 24 are a plurality of plunger devices 25 having recesses 26 in their lower ends to receive the cutting blades 14 and 15 when the beam carrying the plungers is depressed.

The plunger at the left is provided with one single recess and is located to cause its recess to pass over the blade 13 to the left of the first transverse cutting member 14 and thus adapted to sever a potato into two portions. The intermediate plunger is formed with two of the recesses intersecting at right angles and located to pass over the longitudinal cutting member 13 and likewise over the first transverse cutting member 14 at the left, and thus adapted to sever a potato into four sections.

The third plunger, or the one at the right, is formed with one longitudinal recess and two transverse recesses intersecting at right angles and so located that when depressed the longitudinal recess will pass over the longitudinal cutting member 14 and the transverse recesses will pass over the two transverse cutting members at the right, and thus sever the potato into six portions.

Mounted on the frame 12 at the end of the cutting member 13 are blocks 27 and 28, and hingedly mounted at 29, 30, 31 and 32 on the blocks are counter-balanced combined potato supporting and holding members 33 and 34.

The confronting edges of the members 33 and 34 are in spaced relation and provided respectively with transverse slots 35 and 36 corresponding to the cutting members 14. The hinges of the members 33 and 34 are located nearer their inner or confronting edges so that the greater weight is externally of the hinges, hence the members 33 and 34 will rest normally in horizontal position and bearing by their outer portions on the blocks 27 and 28, but adapted to be tilted downwardly by the potatoes laid on their confronting slotted portions. Then when the latter are forced downwardly by the action of the plungers, they will return by gravity to horizontal position when the plungers are returned to their upper position.

Rising from the beam 24 is a standard 37 supported from the beam by braces 38 and slidable through a guideway 39 in the "head" 17. Springs 40 are attached to the beam 24 and the head 17 and operate to hold the beam 24 and its attached plungers yieldably in upper position and return by gravity when the lever is released.

Pivoted at 41 on the standard 15 is an operating lever 42, and extending from the standard 37 is a roller 43 which the lever engages. The lever 42 is guided by a rod 44 attached to the standard 16. By this means the beam 24 with its attached plungers 25 may be moved downwardly against the resistance of the springs 40, and automatically returned to its upper or initial position when the pulling force on the lever is removed.

If the potato to be severed is small and contains a limited number of "eyes", it is placed upon the members 33 and 34 at the dividing line between the confronting edges of the members 33 and 34 and above the longitudinally directed cutter member 13 at the left, and the lever 42 operated to move the beam 24 and its plungers downwardly and causing the potato to tilt the confronting portions of the members 33 and 34 downwardly and divide the potato into two sections by contact with the cutting blade 13, and then when the lever is released the springs 40 return the beam and its plungers into the upper positions, while the members 33 and 34 also return by gravity to their horizontal or initial position. If the potato is larger and contains a greater number of eyes, it is disposed upon the confronting portions of the members 33 and 34 where the clefts or recesses 35 and 36 intersect the spaces between the members 33 and 34, as before described.

The members 33 and 34 serve effectually as supports for the potatoes and hold them in position for the action of the plungers.

The improved device is simple in construction, can be inexpensively manufactured, and of any required size by increasing the number of the plungers.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

1. A potato cutting machine comprising a horizontally disposed rectangular skeleton support, cutters extending across the opening formed by the support, a pair of oppositely disposed hinged and counterbalanced combined potato supporting and holding members suspended over and spaced from said cutters, said members having their opposed sides slotted, and a vertically movable slotted plunger element for forcing the potatoes between said members and against the cutters.

2. A potato cutting machine comprising a horizontally disposed rectangular skeleton support, cutters extending across the opening formed by the support, a pair of oppositely disposed hinged and counterbalanced combined potato supporting and holding members suspended over and spaced from said cutters, said members having their opposed sides slotted, a vertically movable slotted plunger element for forcing the potatoes between said members and against the cutters, and a spring controlled operating means for the plunger element.

3. A potato cutting machine comprising a horizontally disposed rectangular skeleton support, cutters extending across the opening formed by the support, a pair of oppositely disposed hinged and counterbalanced combined potato supporting and holding members suspended over and spaced from said cutters, said members having their opposed sides slotted, a vertically movable slotted plunger element for forcing the potatoes between said members and against the cutters, guiding means for said plunger element, a spring controlled operating means for the plunger element, and means for limiting the upward movement of the plunger element.

In testimony whereof, I affix my signature hereto.

EVAN E. LAWRENCE.